(12) United States Patent
Zhu et al.

(10) Patent No.: US 10,476,915 B2
(45) Date of Patent: Nov. 12, 2019

(54) REAL-TIME COMMUNICATION SIGNALING GATEWAY

(71) Applicant: ORACLE INTERNATIONAL CORPORATION, Redwood Shores, CA (US)

(72) Inventors: Honggang Frank Zhu, Roswell, GA (US); Boris Selitser, Castro Valley, CA (US); Karthic Loganathan, New Albany, OH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 156 days.

(21) Appl. No.: 13/758,768

(22) Filed: Feb. 4, 2013

(65) Prior Publication Data
US 2014/0222890 A1 Aug. 7, 2014

(51) Int. Cl.
*G06F 15/16* (2006.01)
*H04L 29/06* (2006.01)
(Continued)

(52) U.S. Cl.
CPC .......... *H04L 65/1033* (2013.01); *G06F 8/31* (2013.01); *G06F 8/36* (2013.01); *H04L 65/1006* (2013.01); *H04L 67/02* (2013.01); *H04L 67/12* (2013.01)

(58) Field of Classification Search
CPC ..... H04L 29/0854; H04L 29/06; H04L 29/00; H04L 65/1033; H04L 65/00
(Continued)

(56) References Cited

U.S. PATENT DOCUMENTS 6,760,417 B1 7/2004 Wallenius
7,136,913 B2 11/2006 Linderman
(Continued)

FOREIGN PATENT DOCUMENTS

CN 102347950 A * 2/2012
WO WO 2014007708 * 7/2012 ............. H04L 29/06

OTHER PUBLICATIONS

M.Hapner, ED. "The MessageBroker WebSocket Subprotocol", draft-hapner-hybi-messagebroker-subprotocol-03, Aug. 13, 2012, p. 1-11.*
(Continued)

*Primary Examiner* — Jeffrey R Swearingen
*Assistant Examiner* — Messeret F Gebre
(74) *Attorney, Agent, or Firm* — Tucker Ellis LLP

(57) ABSTRACT

The present invention provides a system for real-time communication signaling in a telecommunication network. The system adapts complex signaling on the server-side into simple operations towards the Web. In an embodiment the system includes a server-side web signaling engine and a client-side communication controller. The client-side communication controller provides native operating system application programming interfaces (API) and JavaScript APIs to encapsulate the signaling layer. The web signaling engine includes a controller which terminates HTTP communications with the client-side, parses, and normalizes the HTTP communications into an internal protocol suitable for communication with telecommunications network systems. The gateway system thereby provides a dedicated signaling channel for applications on the client to interact with telecommunications network services.

20 Claims, 4 Drawing Sheets

(51) Int. Cl.
*H04L 29/08* (2006.01)
*G06F 8/30* (2018.01)
*G06F 8/36* (2018.01)

(58) Field of Classification Search
USPC .................................. 709/248, 249, 203
See application file for complete search history.

(56) References Cited

U.S. PATENT DOCUMENTS

| | | | |
|---|---|---|---|
| 7,483,438 B2 | 1/2009 | Serghi et al. | |
| 7,716,240 B2 | 5/2010 | Lim | |
| 8,060,604 B1 | 11/2011 | Breau | |
| 8,185,548 B2 | 5/2012 | Lim | |
| 8,296,409 B2 | 10/2012 | Banerjee et al. | |
| 8,630,299 B1* | 1/2014 | Afshar et al. | 370/401 |
| 9,038,082 B2 | 5/2015 | Maes | |
| 2002/0025795 A1 | 2/2002 | Sharon et al. | |
| 2003/0028790 A1 | 2/2003 | Bleumer et al. | |
| 2004/0009762 A1 | 1/2004 | Bugiu et al. | |
| 2005/0226225 A1* | 10/2005 | Shigeta | H04M 7/0009 370/352 |
| 2005/0245230 A1 | 11/2005 | Benco et al. | |
| 2005/0262075 A1 | 11/2005 | Beartusk et al. | |
| 2006/0025141 A1* | 2/2006 | Marsh | H04W 36/0066 455/445 |
| 2006/0248198 A1* | 11/2006 | Galchev | 709/227 |
| 2007/0106801 A1 | 5/2007 | Jansson | |
| 2007/0143470 A1 | 6/2007 | Sylvain | |
| 2008/0103923 A1 | 5/2008 | Rieck et al. | |
| 2008/0189421 A1* | 8/2008 | Langen | H04L 29/06 709/227 |
| 2008/0271113 A1* | 10/2008 | Belling | H04L 63/20 726/1 |
| 2009/0141704 A1* | 6/2009 | Eng et al. | 370/352 |
| 2009/0225760 A1* | 9/2009 | Foti | H04L 67/142 370/400 |
| 2009/0265607 A1 | 10/2009 | Raz et al. | |
| 2009/0268715 A1 | 10/2009 | Jansson | |
| 2010/0114994 A1 | 5/2010 | Huang et al. | |
| 2010/0142515 A1 | 6/2010 | Jana et al. | |
| 2010/0183131 A1* | 7/2010 | Chang | 379/93.12 |
| 2011/0072144 A1* | 3/2011 | Fikouras | H04L 65/1016 709/230 |
| 2011/0082920 A1 | 4/2011 | Bhattacharya et al. | |
| 2011/0107156 A1 | 5/2011 | Miyata et al. | |
| 2011/0209181 A1 | 8/2011 | Gupta et al. | |
| 2011/0258305 A1 | 10/2011 | Chen | |
| 2011/0258597 A1 | 10/2011 | Chen et al. | |
| 2012/0016932 A1 | 1/2012 | de Castro, Jr. et al. | |
| 2012/0045040 A1 | 2/2012 | Maes | |
| 2012/0072548 A1 | 3/2012 | Kim | |
| 2012/0144416 A1 | 6/2012 | Wetzer et al. | |
| 2012/0151373 A1 | 6/2012 | Kominac | |
| 2012/0178420 A1 | 7/2012 | Ould | |
| 2012/0221559 A1* | 8/2012 | Kidron | G06F 17/30867 707/723 |
| 2012/0233216 A1 | 9/2012 | Lim | |
| 2012/0317474 A1 | 12/2012 | Parreira | |
| 2013/0013804 A1 | 1/2013 | Traynor | |
| 2013/0042152 A1 | 2/2013 | Fryc et al. | |
| 2013/0058262 A1 | 3/2013 | Parreira | |
| 2013/0067333 A1 | 3/2013 | Brenneman | |
| 2013/0073393 A1 | 3/2013 | Nasr | |
| 2013/0094445 A1* | 4/2013 | De Foy et al. | 370/328 |
| 2013/0097239 A1 | 4/2013 | Brown et al. | |
| 2013/0104030 A1 | 4/2013 | Parreira | |
| 2013/0232217 A1 | 9/2013 | Kristiansson | |
| 2014/0007083 A1 | 1/2014 | Baldwin et al. | |
| 2014/0026120 A1 | 1/2014 | Gu et al. | |
| 2014/0040437 A1 | 2/2014 | Mitsuya et al. | |
| 2014/0044123 A1* | 2/2014 | Lawson | H04L 65/1023 370/352 |
| 2014/0075472 A1 | 3/2014 | Mitsuya et al. | |
| 2014/0095724 A1 | 4/2014 | Yoakum | |
| 2014/0126714 A1 | 5/2014 | Sayko | |
| 2014/0156725 A1 | 6/2014 | Mandyam | |
| 2014/0181949 A1 | 6/2014 | Hunter | |
| 2014/0195588 A1 | 7/2014 | Badge et al. | |
| 2014/0280522 A1 | 9/2014 | Watte | |
| 2015/0022619 A1 | 1/2015 | Aleixo Dinis Lopes et al. | |
| 2015/0195309 A1 | 7/2015 | Opsenica | |

OTHER PUBLICATIONS

Wang and K. -. Lin, "Implementing a general real-time scheduling framework in the RED-Linux real-time kernel," Proceedings 20th IEEE Real-Time Systems Symposium (Cat. No. 99CB37054), Phoenix, AZ, USA, 1999, pp. 246-255. (Year: 1999).*
Ritachy, M.G., "Communication concentrators in action", Electronic progress, 22(1), pp. 14-19, 1980. (Year: 1980).*
D. D. Kandhlur, K. G. Shin and D. Ferrari, "Real-time communication in multihop networks," in IEEE Transactions on Parallel and Distributed Systems, vol. 5, No. 10, pp. 1044-1056, Oct. 1994. (Year: 1994).*
BEA, WebLogic Network Gatekeeper, Architectural Overview, Version 3.0, 112 pages, Sep. 2007.
Chen et al., Applying SOA and Web 2.0 to Telecom: Legacy and IMS Next-Generation Architectures, IEEE, 6 pages, 2008.
Oracle Communication Services Gatekeeper Concepts and Architectural Overview, Release 4.1, Oracle, 94 pages, Jan. 2009.
Tomas Ericson et al., "JSR 309 Overview of Media Server Control API" version: Media Server Control API v1.0, Copyright © 2007-2009, 87 pages.
Mihir Kulkarni et al., "SIP Servlet Specification, version 1.1 JSR 289 Expert Group", Aug. 1, 2008, Copyright © 2008 BEA Systems, Inc., 242 pages.
United States Patent and Trademark Office, Office Action dated May 19, 2016 for U.S. Appl. No. 14/069,263, 17 Pages.
United States Patent and Trademark Office, Office Action dated June 9, 2016 for U.S. Appl. No. 14/069,236, 14 Pages.

* cited by examiner

REAL-TIME COMMUNICATION SIGNALING GATEWAY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to a system and method for real-time communication signaling in a telecommunication network.

BACKGROUND

With the explosive proliferation of IP-enabled mobile and fixed devices capable of offering Web, telecom and entertainment services, such as 3G/4G-enabled smart phones, TVs, home appliances, gaming consoles, and automobiles, among others, operators of mobile, broadband and fixed networks are faced with the operational and business challenges of delivering innovative IP-based communication services with maximum profitability. In order to achieve this goal, customers are increasingly migrating away from expensive, closed, proprietary and application-specific legacy platforms, and towards low-cost, open, standards-based unified converged application platforms, which dramatically lowers the time and cost of adding new features and extensions to existing IP-based communication services.

Session Initiation Protocol (SIP) is a control (signaling) protocol developed to manage interactive multimedia IP sessions including IP telephony, presence, and instant messaging. SIP is widely used in telecommunication networks. SIP and other communications centric protocols are complex, and their implementation requires significant domain expertise. However, SIP is not readily compatible with HTTP and use in the Internet domain.

IP Multimedia Subsystem (IMS) is an architecture for providing mobile and fixed multimedia services. IMS is the de facto standard for next-generation networks. IMS uses a Voice-over-IP (VoIP) and runs over the standard Internet Protocol (IP). IMS gives network operators and service providers the ability to control and charge for each service. In addition, IMS is intended to allow users to execute all their services when roaming as well as from their home networks. To achieve these goals, IMS uses open standard Internet protocols.

Thus, IMS provides the interoperability, security, session management and QoS capabilities that telecommunications providers lack and desire. IMS architecture has the capability to support existing phone systems (both packet-switched and circuit-switched). However integration of IMS architecture with legacy SIP-based systems is difficult owing to incompatibility of SIP with HTTP over the Internet domain and the requirement for domain expertise to overcome such incompatibility. Thus, despite the enhanced capabilities that IMS provides, IMS has not been rapidly adopted in telecommunications networks.

It would therefore be desirable to simplify implementation of IMS architecture for telecommunication networks in order to reduce the need for domain expertise and accelerate development thereby accelerating adoption of desired IMS architecture solutions.

SUMMARY

The present invention relates to a system and method for real-time communication (RTC) signaling in a telecommunication network. The system overcomes the need for domain expertise of complex SIP and other communications centric protocols for operation of a telecommunications gateway. The gateway system provides a mechanism to combine complex signaling on the server-side into simple operations towards the Web.

In an embodiment of the invention the gateway system provides an interface between an Internet communication protocol over HTTP and internal systems with a telecommunications network. In an embodiment, the gateway system provides client-side, native operating system application programming interfaces (API) and JavaScript APIs to encapsulate the signaling layer. On the server-side, the gateway system includes controller which terminates the HTTP communications with the client-side, parses, and normalizes the HTTP communications into an internal protocol suitable for communication within legacy telecommunications network systems (for example XMPP, SIP, and the like). The gateway system thereby provides a dedicated "signaling" channel for all the applications on the client to interact with the telecommunications network services.

In a particular embodiment of the invention the gateway system provides an interface between IMS protocol architecture over HTTP over the Internet and SIP legacy systems with a telecommunications network. In an embodiment, the gateway system provides client-side, native operating system application programming interfaces (API) and JavaScript APIs to encapsulate the signaling layer. On the server-side, the gateway system includes controller which terminates the HTTP communications with the client-side, parses, and normalizes the HTTP communications into an internal SIP protocol for communication within legacy telecommunications network systems. The gateway system thereby provides a dedicated "signaling" channel for all the applications on the client to interact with the telecommunications network services.

In an embodiment, the gateway system of the present invention provides a platform to enable telecommunications providers with a better end-to-end customer experience. The gateway system supports and enables IMS client-side communications. The gateway system acts as the IMS proxy for both HTML5 and native clients by taking advantage of WebSocket technology, to enable and expedite the IMS deployment. It is highly scalable, capable of managing millions of network device connections with optimal network traffic characteristics.

In an embodiment, the gateway system provides for real-time communications with applications on a client web browser using HTML and JavaScript API without the need to download any plug-ins. A client-side signaling controller manages signaling over the Web. A web signaling engine sits between the client-side signaling controller and the carrier service layer. The client-side signaling controller and server-side web signaling engine simplify the extension of the carrier services into the browser in turn providing ubiquitous access to these services from any device through the web browser.

Other objects and advantages of the present invention will become apparent to those skilled in the art from the follow-

DETAILED DESCRIPTION

Figure 1:
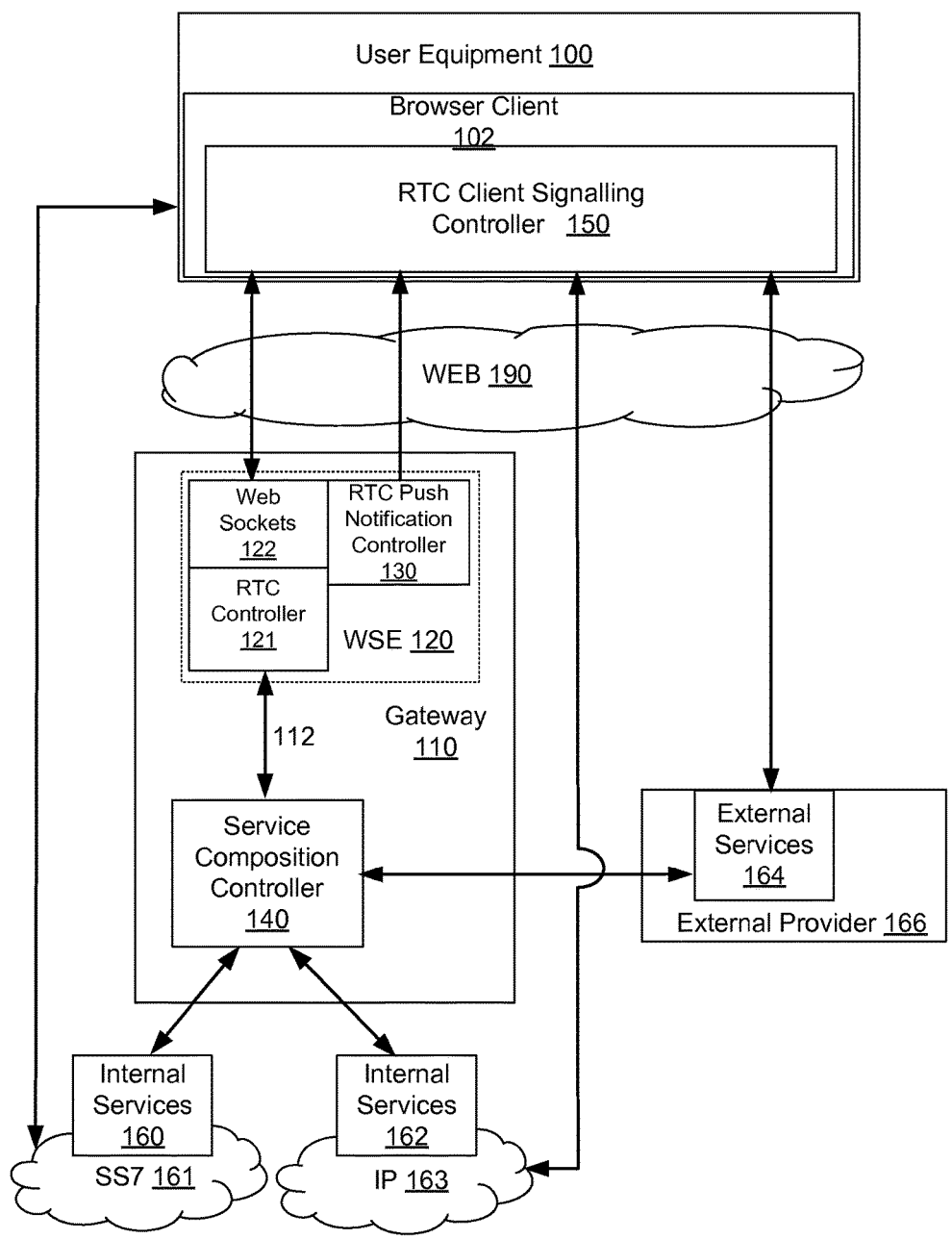
FIG. 1 shows a system for real-time communication signaling according to an embodiment of the present invention.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

The present invention relates to a gateway system for real-time communication signaling in a telecommunication network. The system provides a dedicated "signaling" channel for all the applications on the client to interact with legacy networks. The system overcomes the need for domain expertise of complex SIP and other communications centric protocols for operation of a telecommunications gateway. The system provides a mechanism, described below, to combine complex signaling on the server-side (carrier side) into simple operations towards the Web. In an embodiment, the system provides client-side, native operating system application programming interfaces (API) and JavaScript APIs to encapsulate the signaling layer. The gateway system thereby provides a dedicated "signaling" channel for all the applications on the client to interact with the telecommunications network services.

In an embodiment of the present invention, a server-side signaling engine supports the IMS client-side strategy. The server-side signaling engine acts as the IMS proxy for both HTML5 and Native Clients by taking advantage of Web-Socket technology thereby enabling and expediting IMS deployment. The server-side signaling engine is built on a platform which simplifies configuration and deployment management of the system. Multiple deployment options include an engineered system or software only on virtual machines to match the deployment goals of the telecommunications provider. The server-side system is highly scalable, capable of managing millions of network device connections with optimal network traffic characteristics.

In an embodiment, the system additionally provides for IMS as cloud service to telecommunications providers ensuring that next generation killer applications will run on top of the existing telecommunications infrastructure. The gateway system allows external providers of over-the-top ("OTT") services to provide OTT services to users/clients. Such OTT services often demand real-time communication signaling, and the gateway system enables the external providers to make use of the dedicated "signaling" channel. The clients/users can then access web applications provided by external providers from a browser on the user equipment.

The Web platform is ubiquitous and provides a cross-device application environment. Real-time communication over the Web opens up the potential to create innovative services creating new business opportunities for the carriers. In an embodiment, the gateway system provides for real-time communication by encapsulating and enabling communications with applications on a client web browser using HTML and JavaScript API on the client-side without the need to download any plug-ins. The gateway system provides a web signaling engine (WSE) which sits between the browser and the Carrier Service Layer. The WSE simplifies the extension of the carrier services into the browser, in turn providing ubiquitous access to these services from any device through the Web browser.

FIG. 1 shows a gateway 110 for real-time communication signaling according to an embodiment of the present invention. As shown in FIG. 1, Gateway 110 includes RTC Controller 121, RTC Push Notification Controller 130, and Service Composition Controller 140. RTC Controller 121 and RTC Push Notification Controller 130 interact with RTC Client Signaling Controller 150 over the Web 190. RTC Controller 121 communicates internally 112 using SIP protocol with Service Composition Controller 140. Service Composition Controller 140 mediates provision of Internal Services 160, 162 and External Services 164 of an External Provider 166. RTC Push Notification Controller 130, RTC Controller 121 and Web Sockets Interface 122 together comprise an embodiment of a web signaling engine (WSE 120).

RTC Controller 121 provides scalable signaling over HTTP web-centric protocols for communicating over Web 190 with RTC Client Signaling Controller 150. RTC Controller 121 communicates with RTC Client Signaling Controller 150 via web sockets interface 122. RTC Controller 121 provides a highly available, encapsulated front end interface to the web developer. The RTC Controller 121 terminates the HTTP communications with the client-side by managing the web socket connections. The RTC Controller 121 also parses and processes the HTTP communications. The RTC Controller 121 normalizes the HTTP communications into an internal SIP protocol for communication within Gateway 110. Thus, RTC Controller 121 communicates internally with Service Composition Controller 140 using a binary SIP protocol.

Service Composition Controller 140 provides for service composition and orchestration across domains and different providers. The Service Composition Controller 140 also provides a unified layer to inject charging and policy control for differentiated service offerings. In an embodiment the functionality of Service Composition Controller 140 can be integrated in to a converged application server, for example Oracle™ Communications Converged Application Server (OCCAS). Alternatively, the functionality of Service Composition Controller 140 can be integrated in to a service controller, for example Oracle™ Communications Service Controller (OCSC).

Service Composition Controller 140 adopts and reuses existing internal communication services with support for different signaling protocols. Thus, for example, Service Composition Controller 140 can mediate: Internal Services 160 providing network telephony signaling using the SS7 protocol 161; and Internal Services 162 providing services using internet protocol 163.

Service Composition Controller 140 can also mediate the provision of external services 164 provided by an external service provider 166. Communication with external provider 166 can be conducted using a selected signaling protocol SIP, XMPP etc as required by the external provider 166. Services provided by external provider 166 can include web services provided over Web 190 to a browser client 102 on user equipment 100. Service Composition Controller 140 thus enables external providers of over-the-top ("OTT") services to provide OTT services to users/clients. The gateway system enables the external providers to make use of the real-time communication signaling over IMS. The users/clients can then access web applications provided by external providers from a browser on the user equipment. The gateway system acts as the IMS proxy for both HTML5 and external providers by taking advantage of WebSocket technology, to enable and expedite the IMS deployment.

RTC Client Signaling Controller 150 is resident on user equipment 100 and manages multiplexing of signaling request/response for all client-side applications mediating communication with RTC Controller 121 over HTTP web-centric protocols. The particular HTTP protocol used can be defined as required by the particular native or external service, for example, JSON, XML, XMPP, Skype protocol etc. A client-side library of available protocols is provided as part of an SDK in order to extend the services to the client.

For telephony applications low power consumption by user equipment 100 is desirable. Accordingly RTC Client Signaling Controller 150 can be placed in standby operation when not involved in signaling. Moreover web socket protocol must be initiated from the client-side and is also responsible for keeping the connection alive. Thus, the RTC Client Signaling Controller 150 will shut down the web socket connections when there is no traffic. RTC Push Notification Controller 130 can be used by RTC Controller 121 to "wake-up" RTC Client Signaling Controller 150 from the standby state in order to resume communication. The RTC Push Notification Controller 130 may, in some embodiments, also be used for other notifications such as call notifications, message notifications, and the like.

RTC Push Notification Controller 130 includes a server-side HTTP connection based Push Notification to wake up the client-side signaling process. RTC Client Signaling Controller 150 can utilize any push notification mechanism and protocol effective for user equipment 100. For example, RTC Push Notification Controller 130 can utilize the SMS message system to activate RTC Client Signaling Controller 150, thereby causing RTC Client Signaling Controller 150 to reactivate the web sockets connection with the RTC Controller 121.

Figure 2:
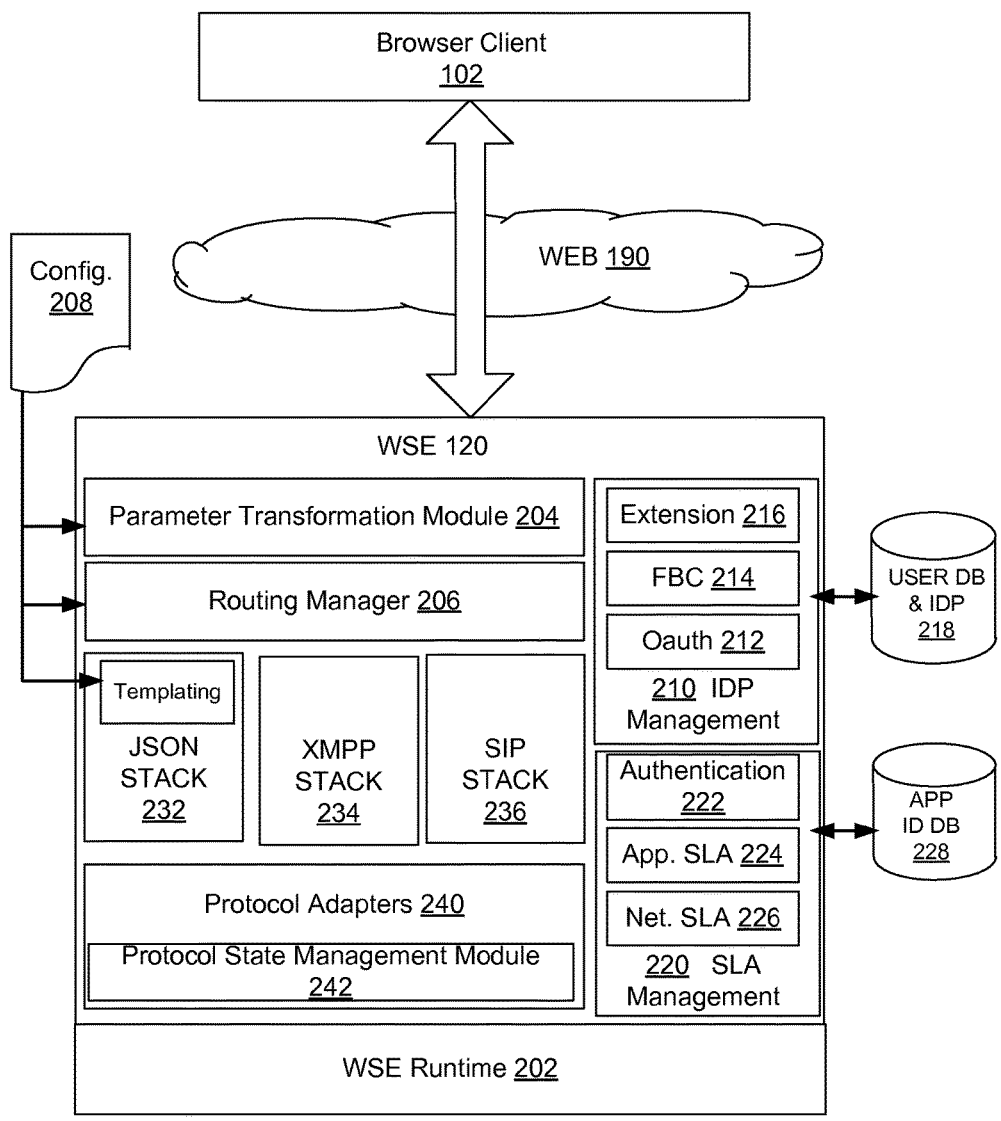
FIG. 2 shows a server-side web signaling engine according to an embodiment of the invention.

FIG. 2 shows an embodiment of server WSE 120 according to an embodiment of the invention. WSE 120 is deployed between the browser client 102 and the service composition controller 140 for exposing the internal and external services 160, 162, 164 to the client browser 102 (see FIG. 1). WSE 120 enables the browser as a client for the network services and hence acts as a browser adapter. WSE 120 enables browser client management and ensures reliability of the service end to end (browser to network). WSE 120 provides a number of features to the carriers and enterprise customers as described below.

WSE 120 including WSE runtime module 202 supports multiple signaling protocols and ensures correct mapping of the signaling message using parameter transformation module 204 and correct routing of the messages based on routing profiles using routing manager 206. Parameter transformation, routing and JSON templating are all configurable using a configuration file 208.

WSE 120 performs protocol mapping between the selected client-side protocol and the network side protocol (SIP). For example, WSE is adapted to receive a JSON message, parse the SDP information and map it to other supported protocols (SIP/XMPP). WSE 120 maintains a data definition for the format to parse to. When the JSON request is received at WSE 120, the transformation between the data definition and the JSON message structure must be implemented.

WSE 120 acts as a cross protocol signaling engine. WSE 120 handles the protocol associated state as demanded by the protocol. When WSE 120 is acting as a cross-protocol gateway, for example, JSON/WebSocket to SIP, the SIP side of WSE 120 maintains the transaction and dialog state. WSE 120 includes a protocol state management module 242 which manages the protocol state and ensures state replication for reliability of message exchange. WSE 120 has the ability to manage enormous amounts of concurrent client connections in order to be able to scale to the applications and users on the web.

For developers, the key is to leverage existing knowledge and skill sets to minimize additional time and resources required by security features implementation. WSE 120 comes with APIs that support multiple platforms running under multiple protocols and a set of client libraries to facilitate smooth development process. WSE 120, thus, additionally provides an extensibility framework to extend the capabilities via protocol adaptors 240 and APIs for the web developers to call the WSE functions from their applications.

WSE 120 provides signaling adaption such that WSE 120 handles all the signaling between the browser client 102 and the network end point (SIP Proxy, PSTN Gateway for example). WSE 120 is adapted to handle the message exchange using several protocols over WebSocket (RFC 6455) including, for example: JSON based protocol via JSON Stack 232; XMPP sub-protocol via XMPP Stack 234; SIP sub via SIP Stack 236; BOSH (XEP-0124); and COMET (Bayeux protocol) (not shown). On the network/carrier side the web signaling engine supports translation into a suitable communication protocol or protocols (e.g. XMPP, SIP and the like). Thus, for example, on the network/carrier side, WSE 120 supports SIP (RFC 3261).

Security for real-time communication over the Web requires that the communicating endpoints be able to authenticate each other. While these end points are making calls through the signaling services, their identities are authenticated via an Identity Provider Management Module (IDP) 210 that supports OAuth 212, Facebook Connect (FBC) 214 and other Identity Protocols using extensions 216 (e.g. OpenID connect). IDP Management modules 210 interact with internal and/or external user database and identity servers 218.

WSE 120 thereby acts as an identity service that can attest the identity of the caller of the received request and map it to the "from" identity of the outbound call. For example, WSE 120 includes OAUTH module 202 which introduces security functions that authenticate and authorize the browser-based applications to interact with the network services. WSE 120 thereby provides service providers with the ability to control any third party partner's access and usage of its network capabilities.

Establishing real-time communication over the Web also utilizes verification of service level agreements (SLA) for the user and application. SLA Management module 220 includes an authentication module 222, as well as an application SLA module 224 and network SLA module 226 which communicate with internal and/or external databases 228 to verify that the communications are provided in conformance with the relevant service level agreements for the user and application.

In a particular embodiment, WSE 120 defines a JavaScript Object Notation (JSON) protocol that is used for exchanging information and to control the set up of media between a browser client 102 and WSE 120. JSON is a lightweight data-interchange format however other data-interchange formats may be used in alternative embodiments. The JSON protocol can be used on multiple transports (COMET, BOSH, and WebSocket). When used on WebSocket transport, the protocol is defined as a sub-protocol of the WebSocket protocol.

The JSON protocol (or alternative data-interchange format) defines the basic structure for the information transfer between the browser client 102 and WSE 120. The JSON protocol defines the minimum set of messages and state machinery necessary to implement the offer/answer model. The JSON protocol defines the message structure that accounts for the reliability (reconnect, retransmissions, timeouts etc) of the message. The JSON protocol also handles the necessary headers to function in multilevel secure environment (security headers).

WSE 120 also provides an internal routing manager 206 for the routing of the requests to the appropriate end nodes based on variety of parameters. There are multiple WSE instances (see FIG. 3) and each instance is connected to the network node serving the functionality. The incoming requests (JSON messages, for example) have to be routed to the right application and instance. WSE 120 uses routing manger 206 to route incoming requests based on their origination and destination. WSE 120 provides functionality including performing look-ups and route requests for JSON to SIP, JSON to XMPP, SIP to XMPP, XMPP to SIP. Each route in the WSE routing manager 206 has a routing profile. WSE 120 provides a default routing profile and additional routing profiles are configurable as needed or desired.

Figure 3:
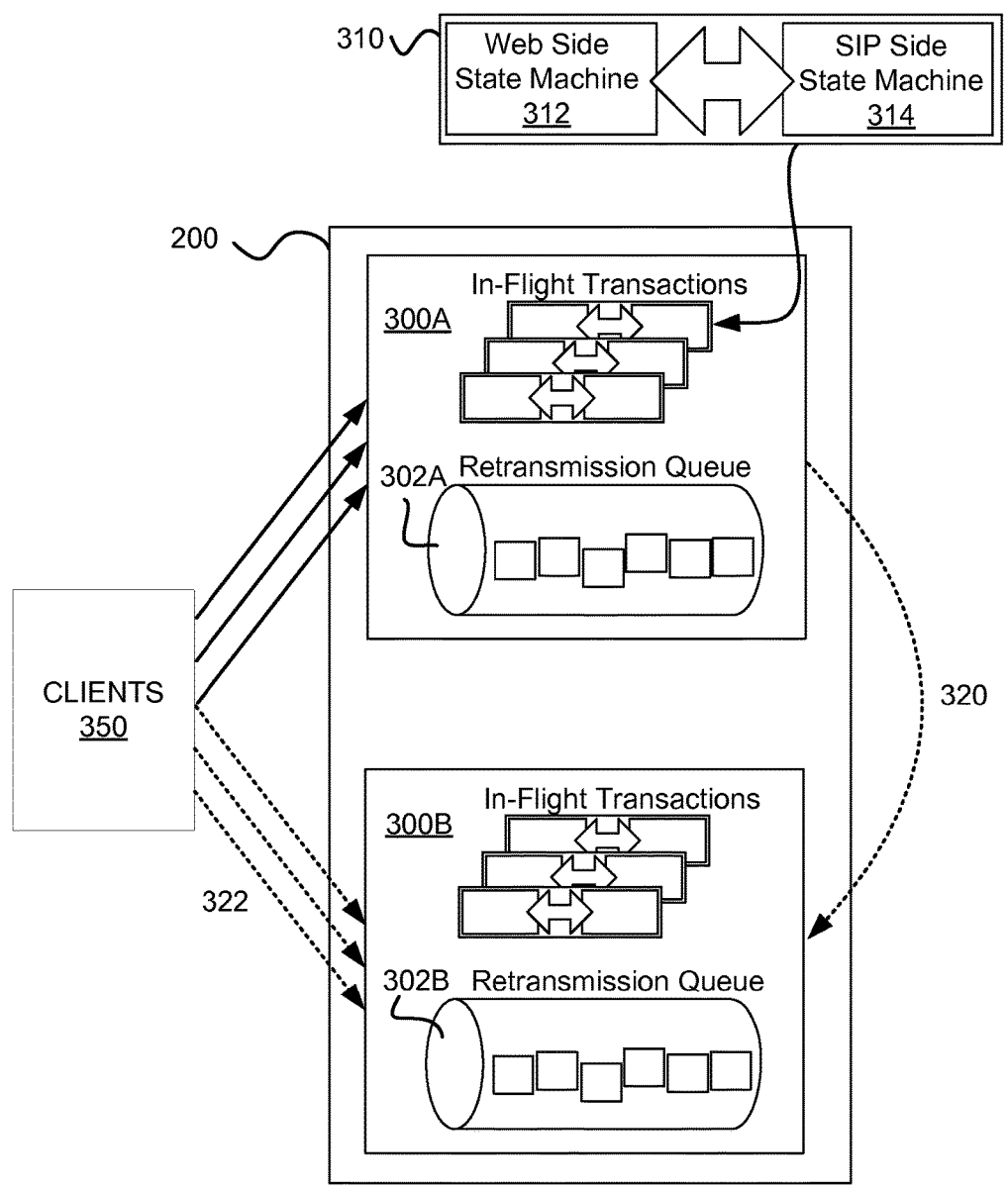
FIG. 3 shows an aspect of the server-side web signaling engine of FIG. 2 according to an embodiment of the invention.

FIG. 3 shows an aspect of WSE 120 of FIG. 2 according to an embodiment of the invention. WSE 120 maintains session control information, protocol state, dialog state, transaction state. WSE 120 provides for state maintenance and session state mapping across protocols. WSE 120 also enables hooks into the media session state. WSE 120 also maintains the SDP Agent information. WSE 120 operates to ensure reliable message exchange with clients 350.

WSE 120 ensures reconnection of clients due to failover or loss of connectivity. Clients and servers use an implicit sequence numbering protocol for the message transported by the connection. Clients and the servers each maintain their own sequence number. Both client and server acknowledge their receipt of messages by sending acknowledgement ("ack") messages. As per the protocol, an ack message indicates that the message has reached the destination (as well as all the messages lower than that sequence). Similarly an error message shall be defined (as in the JSON protocol section) to indicate that the message with a sequence number has met with an error. Retransmission Queue 302A, 302B allows for retransmission of messages for which there is an error or lack of acknowledgement.

One way in which WSE 120 maintains reliability is to keep the relevant conversation state redundant across different servers 300A, 300B having instances of WSE 120. WSE 120 provides for state maintenance and session state mapping across protocols. The relevant conversation state includes a Web Side State Machine 312 and SIP Side State Machine 314 for each In-Flight Transaction 310. WSE 120 maintains the session states (both client and server side state) in the cache. In order to ensure reliability, the cached copy of the state machines is duplicated on several servers. Additionally retransmission queue 302A, 302B is duplicated across servers 300A, 300B. WSE 120 uses coherence for state storage and management. If a server, for example server 300A cannot be contacted due to a network failure WSE 120 ensures that the state is retrieved from another active server 300B as shown by the dashed arrows 320, 322.

Figure 4:
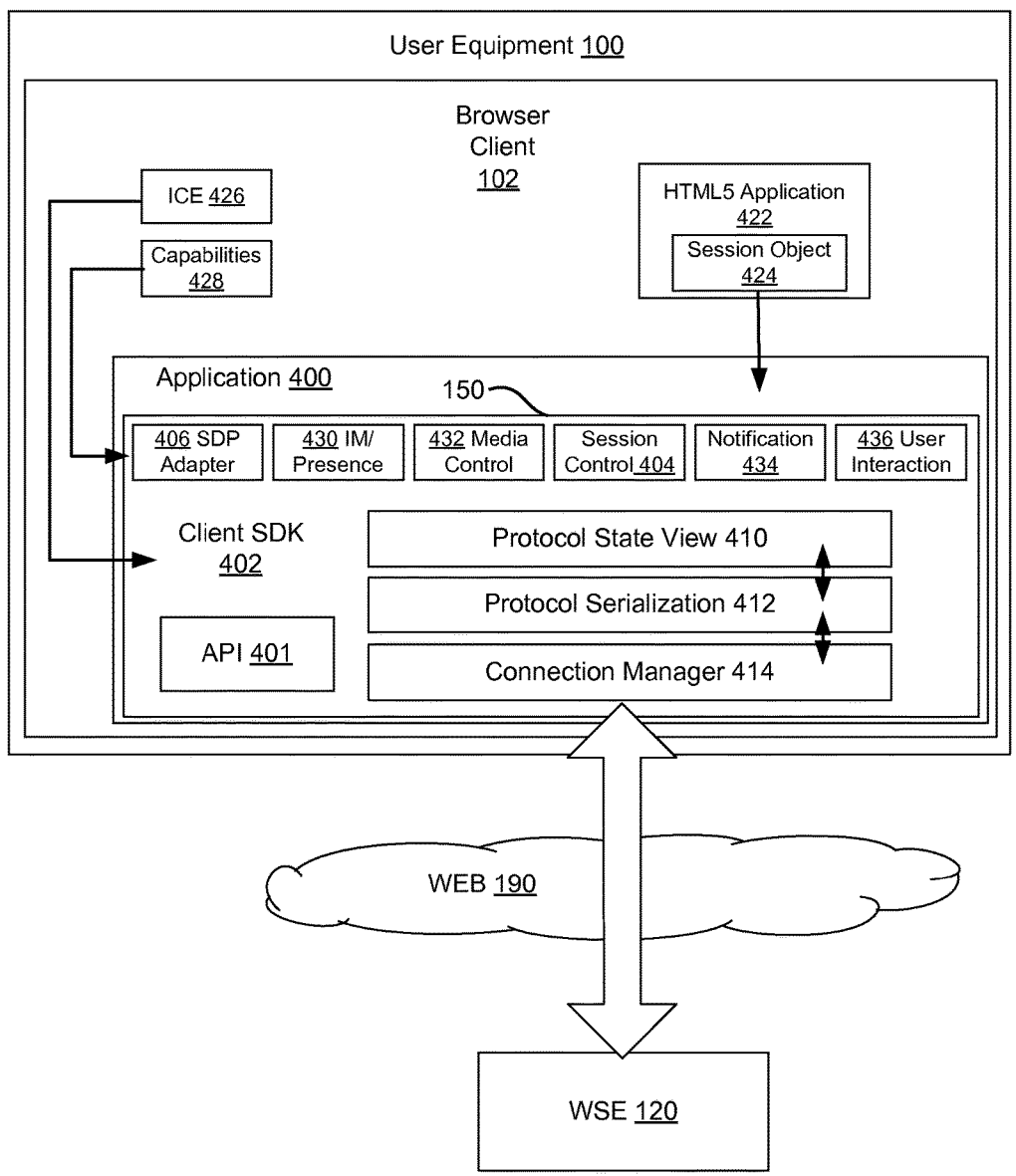
FIG. 4 shows a client-side RTC signaling controller according to an embodiment of the invention.

FIG. 4 shows an implementation of a client-side RTC signaling controller 150 as shown in FIG. 1 according to an embodiment of the invention. In an embodiment client-side RTC signaling controller 150 is implemented as part of an application 400 running on a browser client 102 (for example a JSS/CSS/HTML5 application). Application 400 is resident on user equipment 100 such that RTC signaling controller 150 manages multiplexing of signaling request/response for all client-side applications mediating communication with WSE 120, WSE 120 (see FIGS. 1 and 2). Application 400 includes IM/presence module 430, media control module 432, notification module 434, and user interaction module 436.

In an embodiment application 400 is a JavaScript Application. Application 400 operates at a high level without having to deal with peer connection directly. The browser client 102 is stateless and contains as little of the implementation of the transport establishment code as possible. Browser client 102 identifies the capabilities 428 of the browser client 102 and user equipment 100 for streaming media. The capabilities 428 are provided to the SDP adapter 406 of the application 400. SDP adapter 406 provides a description of streaming media initialization parameters—a session profile—suitable for streaming media to the browser client 102 running on user equipment 100.

A client-side library of available protocols is provided as part of a Client SDK 402 in order to extend the services to the browser client 102. The particular HTTP protocol used can be defined as required by the particular native or external service, for example, JSON, XML, XMPP, Skype protocol etc. In a preferred embodiment a JSON protocol is used for communication between client-side RTC signaling controller 150 and WSE 120 as described above.

Protocol serialization 412 interacts with protocol state view 410 and connection manger 414 to communicate with WSE 120 over Web 190. Session Control 404 establishes reliable connection with WSE 120. This session can be used by the application 400 to create or invoke other objects.

RTC signaling controller 150 comprises a JavaScript SDK 402 which provides the functions necessary for application 400 to manage server connections (connection establishment, teardown via web socket). The JavaScript SDK 402 provides functions necessary to handle the state machine and functions to deal with interoperability issues. For example, the JavaScript SDK 402 of application 400 provides functions to create messages or insert messages into the state machine. The JavaScript SDK 402 also provides functions for the client to monitor connection health, including the ability to reconnect in case of stale connections and the ability to synchronize state from the server and add modified state back to the server.

JavaScript SDK 402 also provides an application programming interface (API) 401 which can modify and optimize media parameters, session description protocol (SDP) etc The API 401 abstracts out complex functionality and provides API to deal with the real-time communication session, Call etc. The API 401 provides the ability to handle call states, media states, subscriptions and notifications.

In operation, HTML5 applications 422 access the JavaScript APIs to get access to various communication objects as defined in the API 401. An HTML5 application 422 will create a session object 424. The session object 424 acts as browser side representation of the communication. From session object 424, application 400 can create different communication objects like Call, Subscription etc. The HTML5 application can listen on the callbacks from the objects to receive incoming calls, notifications, media in the call, state changes etc.

The Interactive Connectivity Establishment (ICE) draft, developed by the IETF's MMUSIC working group, provides a framework to unify the various NAT traversal techniques. ICE defines a standardized method for clients to determine what type of firewall(s) exist between clients and determine a set of IP addresses by which clients can establish contact. When an ICE-enabled client (the initiator) wishes to communicate with another device (the responder), it first collects information on addresses where the client can receive IP traffic. A key benefit that ICE provides is the ability to unify the information provided by these various sources of IP address information to create as many paths as possible by which the endpoints can be reached.

For real-time communication over the Web, the ICE state machine 426 is maintained by the browser client 102. When the browser client 102 reloads, the application 400 has no knowledge of the ICE Candidates and is forced to perform ICE restart. In order to avoid this, application 400 can save this information in WSE 120. When the initial ICE negotiation finishes, the browser client 102 sends the nominated ICE candidate pair of IP addresses to the application 400 which saves this information in WSE 120. When the browser client 102 reloads, the application 400 will fetch the nominated ICE candidate information from the server, and then send it to the browser client 102. This will tell the browser client 102 to use these candidates for media transfer. Since the browser client 102 has kept the local nominated ICE candidate alive all the time, as long as the remote side has not released the call, the transfer will succeed.

Although the invention has been described above with respect to communication services in a telecommunications network, the invention also finds application in any situation where it is necessary or desirable to provide real-time communication signaling.

The present invention may be conveniently implemented using one or more conventional general purpose or specialized digital computer, computing device, machine, or microprocessor, and/or network of same, programmed according to the teachings of the present disclosure.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for real-time communication signaling between a client-side application and a telecommunications network comprising one or more internal services offered via the telecommunications network, the system comprising:
   a telecommunications network gateway comprising one or more microprocessor wherein the telecommunications network gateway is a node within the telecommunications network, and wherein the telecommunications gateway further comprises:
      a server-side web signaling engine operating in the telecommunications network gateway;
      wherein the server-side web signaling engine comprises a WebSocket interface which receives JavaScript Object Notation (JSON) communications from the client-side application via the Internet, wherein the JSON communications comprise requests for services from said client-side application;
      wherein the server-side web signaling engine comprises a push notification controller for activating the client-side application to resume communication over said WebSocket interface where said client-side application has entered a standby state in response to a period in which no traffic was communicated over said WebSocket interface;
      wherein the server-side web signaling engine comprises a real-time communication controller which receives said JSON communications from the Web-Socket interface, terminates said JSON communications, parses session description protocol (SDP) information from said JSON communications, maps the parsed SDP information to the Session Initiation Protocol (SIP) protocol, thereby creating SIP communications from the received JSON communications;

wherein said real-time communication controller uses an implicit sequence numbering protocol in which the real-time communication controller sends acknowledgement messages in response to said JSON communications indicating that said JSON communications have reached the real-time communication controller wherein each said acknowledgement communication is indicative that a particular JSON communication having a particular sequence number and all JSON communications having a sequence number lower than the particular sequence number, have been received by said real-time communication controller;

a service composition controller operating in the telecommunications network gateway, wherein the server-side web signaling engine transmits said SIP communications in a binary SIP protocol to the service composition controller of the telecommunications network gateway;

wherein said service composition controller communicates said requests for services comprised in said JSON communications to said internal services in response to said SIP communications transmitted from the server-side web signaling engine in the binary SIP protocol; and wherein said internal services provide services responsive to said requests for services, to said client-side application, via said WebSocket interface of said real-time communication controller of said server-side web-signaling engine, in response to said SIP communications transmitted from the real-time communication controller.

2. The system of claim 1, wherein the server-side web signaling engine performs session state mapping across protocols and maintains a web-side state machine and an SIP state machine for transactions over said WebSocket interface.

3. The system of claim 1, wherein the server-side web signaling engine comprises an authorization module which authenticates and authorizes client-side applications accessing the telecommunications network gateway via said WebSocket interface over the Internet.

4. The system of claim 1, further comprising:
a retransmission queue which provides for retransmission of JSON communications over said WebSocket interface when an error or lack of acknowledgement occurs.

5. The system of claim 1, further comprising a unified layer for injection of charging and policy control for a plurality of differentiated services within said telecommunications network gateway.

6. The system of claim 1, further comprising:
a web-side state machine and an SIP state machine for transactions over said WebSocket interface;
a retransmission queue which provides for retransmission of JSON communications over said WebSocket interface when an error or lack of acknowledgement occurs; and
a cache which maintains duplicate copies of session state for said web-side state machine, said SIP state machine and said retransmission queue for in-flight transactions over said WebSocket interface;

whereby one of said duplicate copies of session state can be retrieved by another telecommunications network gateway node upon failure of the telecommunications network gateway node.

7. The system of claim 1, wherein the server-side web signaling engine further includes a cache which maintains duplicate copies of session state mapping of a JSON state machine and SIP state machine for in-flight transactions over said WebSocket interface.

8. A method for real-time communication signaling between a client-side application operating on user equipment and a telecommunications network, the method comprising:
providing in the telecommunications network a telecommunications network gateway comprising a server-side web signaling engine and a service composition controller, the network gateway a node on the telecommunications network;
providing a WebSocket interface to a real-time communication controller of said server-side web signaling engine;
receiving JavaScript Object Notation (JSON) communications comprising requests for services from said client-side application via said WebSocket interface;
using an implicit sequence numbering protocol in which the real-time communication controller sends acknowledgement messages in response to said JSON communications indicating that said JSON messages have reached the real-time communication controller wherein each said acknowledgement message is indicative that a particular JSON message having a particular sequence number and all JSON messages having a sequence number lower than the particular sequence number, have been received by said real-time communication controller;
terminating the JSON communications with the real-time communication controller;
activating the client-side application by sending a push notification from the server-side web signaling engine to the user-equipment to resume communication over said WebSocket interface where said client-side application has entered a standby state in response to a period in which no traffic was communicated over said WebSocket interface;
parsing session description protocol (SDP) information from the JSON communications;
mapping the parsed SDP information to the Session Initiation Protocol (SIP) protocol, thereby creating SIP communications from the received JSON communications;
transmitting the SIP communications from the real-time communication controller in a binary SIP protocol to the service composition controller of the telecommunications network gateway responsive to said JSON communications;
communicating requests for services from said service composition controller to internal services offered via the telecommunications network in response to said SIP communications transmitted from the real-time communication controller in the binary SIP protocol; and
providing services, responsive to said requests for services, from the internal services of the telecommunications network, to said client-side application, via said WebSocket interface of said real-time communication controller of said server-side web-signaling engine, in response to said SIP communications transmitted from the real-time communication controller.

9. The method of claim 8, further comprising:
maintaining a web-side state machine and an SIP state machine for transactions over said WebSocket interface.

10. The method of claim 8, wherein said receiving step comprises:
authenticating and authorizing in said telecommunications network gateway client-side applications accessing the telecommunications network gateway via said WebSocket interface over the Internet.

11. The method of claim 8, further comprising:
providing within said telecommunications network gateway a unified layer for injection of charging and policy control for a plurality of differentiated services.

12. The method of claim 8, further comprising:
maintaining retransmission queue which provides for retransmission of JSON messages for which there is an error or lack of acknowledgement;
maintaining a JSON state machine and SIP state machine for in-flight transactions over said WebSocket interface;
maintaining duplicate cached copies of session state for said retransmission queue, said JSON state machine and said SIP state machine whereby one of said duplicate cached copies of session state can be retrieved by another telecommunications network gateway upon failure of the telecommunications network gateway.

13. The method of claim 8, further comprising:
providing a retransmission queue which provides for retransmission, over said WebSocket interface, of JSON messages for which there is an error or lack of acknowledgement.

14. The method of claim 8, further comprising:
maintaining duplicate cached copies of a JSON state machine and SIP state machine for in-flight transactions over said WebSocket interface.

15. A non-transitory computer readable storage medium including instructions stored thereon for supporting real-time communication signaling between a client-side application operating on user equipment and a telecommunications network, which instructions, when executed by a computer system, cause the computer system to perform steps comprising:
providing in the telecommunications network a telecommunications network gateway comprising a server-side web signaling engine and a service composition controller, the network gateway a node on the telecommunications network;
providing a WebSocket interface to a real-time communication controller of said server-side web signaling engine;
receiving JavaScript Object Notation (JSON) communications comprising requests for services from said client-side application via said WebSocket interface;
using an implicit sequence numbering protocol for said JSON communications in which the real-time communication controller sends acknowledgement messages in response to said JSON communications indicating that said JSON communications have reached the real-time communication controller wherein each said acknowledgement communication is indicative that a particular JSON communication having a particular sequence number and all JSON communications having a sequence number lower than the particular sequence number, have been received by said real-time communication controller;
terminating the JSON communications with the real-time communication controller;
parsing session description protocol (SDP) information from the JSON communications;
mapping the parsed SDP information to the Session Initiation Protocol (SIP) protocol, thereby creating SIP communications from the received JSON communications;
transmitting the SIP communications from the real-time communication controller in a binary SIP protocol to the service composition controller of the telecommunications network gateway responsive to said JSON communications;
communicating requests for services from said service composition controller to internal services offered via the telecommunications network in response to said SIP communications transmitted from the real-time communication controller in the binary SIP protocol; and
providing services, responsive to said requests for services, from the internal services of the telecommunications network, to said client-side application, via said WebSocket interface of said real-time communication controller of said server-side web-signaling engine, in response to said SIP communications transmitted from the real-time communication controller.

16. The non-transitory computer readable storage medium of claim 15, wherein said steps further comprise:
maintaining a web-side state machine and a SIP state machine for transactions over said WebSocket interface; and
maintaining a retransmission queue which provides for retransmission, over said WebSocket interface, of JSON messages for which there is an error or lack of acknowledgement.

17. The non-transitory computer readable storage medium of claim 15, wherein said receiving step comprises:
authenticating and authorizing in said telecommunication network gateway client-side applications accessing the telecommunications network gateway via said WebSocket interface over the Internet.

18. The non-transitory computer readable storage medium of claim 15, wherein the steps further comprise:
activating the client-side application by sending a notification from the server-side web to resume communication over said WebSocket interface where said client-side application has entered a standby state in response to a period in which no traffic was communicated over said WebSocket interface.

19. The non-transitory computer readable storage medium of claim 15, wherein the steps further comprise:
providing, in said server-side web signaling engine, a unified layer for injection of charging and policy control for a plurality of differentiated services.

20. The non-transitory computer readable storage medium of claim 15, wherein the steps further comprise:
maintaining a web-side state machine and an SIP state machine for transactions over said WebSocket interface;
maintaining a retransmission queue which provides for retransmission of JSON messages for which there is an error or lack of acknowledgement;

maintaining duplicate cached copies of session state for said retransmission queue, said HTTP web-side state machine, and said SIP state machine for in-flight transactions.

* * * * *

UNITED STATES PATENT AND TRADEMARK OFFICE
CERTIFICATE OF CORRECTION

PATENT NO. : 10,476,915 B2
APPLICATION NO. : 13/758768
DATED : November 12, 2019
INVENTOR(S) : Zhu et al.

Page 1 of 1

It is certified that error appears in the above-identified patent and that said Letters Patent is hereby corrected as shown below:

In the Claims

In Column 15, Line 2, in Claim 20, after "queue, said" delete "HTTP".

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*